(12) United States Patent
Karunakar et al.

(10) Patent No.: US 10,181,267 B2
(45) Date of Patent: Jan. 15, 2019

(54) RECEIVING AND PROCESSING WEATHER DATA AND FLIGHT PLAN DATA

(71) Applicant: HONEYWELL INTERNATIONAL INC., Morris Plains, NJ (US)

(72) Inventors: Manjunatha Karunakar, Karnataka (IN); Srihari Jayathirtha, Karnataka (IN); Mohan Rao A, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/443,150

(22) Filed: Feb. 27, 2017

(65) Prior Publication Data

US 2018/0247547 A1 Aug. 30, 2018

(51) Int. Cl.
| G06F 7/70 | (2006.01) |
| G06F 19/00 | (2018.01) |
| G06G 7/00 | (2006.01) |
| G06G 7/76 | (2006.01) |
| G08G 5/00 | (2006.01) |
| H04B 7/185 | (2006.01) |
| B64D 45/00 | (2006.01) |
| B64D 11/00 | (2006.01) |
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
CPC ........... *G08G 5/0091* (2013.01); *B64D 11/00* (2013.01); *B64D 45/00* (2013.01); *G08G 5/003* (2013.01); *H04B 7/18506* (2013.01)

(58) Field of Classification Search
CPC ...... G08G 5/0091; G08G 5/003; B64D 11/00; B64D 45/00; G01S 15/953; G01C 21/36; G09B 9/08; G06F 17/00
USPC .................................. 701/14, 3, 201; 434/37
See application file for complete search history.

(56) References Cited

U.S. PATENT DOCUMENTS

| 7,394,723 | B2 | 7/2008 | Rubin | |
| 9,126,696 | B1 | 9/2015 | Hampel et al. | |
| 9,244,167 | B1 * | 1/2016 | Oransky | G01S 13/953 |
| 2002/0164559 | A1 * | 11/2002 | Ransom | B64D 47/00 434/37 |

(Continued)

OTHER PUBLICATIONS

Guidance on Turbulence Management; © 2015 International Air Transport Association. All rights reserved. Montreal—Geneva.

*Primary Examiner* — Mahmoud S Ismail
(74) *Attorney, Agent, or Firm* — Lorenz & Kopf, LLP

(57) ABSTRACT

An apparatus and method for receiving and processing weather data and flight plan data is disclosed. A processor is configured to receive flight plan data containing at least a moving path of an aircraft; receive weather data containing at least positional information and weather characteristics; compare the positional information of the weather data with the flight plan data; determine if the weather characteristics impact a predetermined operating condition of the aircraft; compare the impact of the weather characteristics to the operating condition with a predetermined threshold value; and provide an indication signal indicating a section of the moving path of the aircraft where the impact of the weather characteristics to the operating condition exceeds the predetermined threshold value.

5 Claims, 3 Drawing Sheets

(56) References Cited

U.S. PATENT DOCUMENTS

2004/0044445 A1* 3/2004 Burdon ................. G01C 23/00
                                                    701/3
2009/0112638 A1  4/2009 Kneller et al.
2010/0100310 A1* 4/2010 Eich ................... G01C 21/3661
                                                    701/533

* cited by examiner

RECEIVING AND PROCESSING WEATHER DATA AND FLIGHT PLAN DATA

TECHNICAL FIELD

The disclosure generally relates to receiving and processing weather data and flight plan data of an aircraft. In particular, the disclosure relates to a processing unit for receiving and processing weather data and flight plan data of an aircraft, to an aircraft with such a processing unit, and to a method for receiving and processing weather data and flight plan data.

BACKGROUND

During flight of an aircraft, information about weather conditions ahead of the current position and along a planned moving path of the aircraft may be crucial for operating procedures aboard the aircraft. Especially, detailed knowledge about weather data ahead of an aircraft and the moving path of the aircraft may be helpful for operating procedures aboard the aircraft.

For example, due to the lack of real time weather information in the cabin, especially that of turbulence at the current position and along the flight path, the cabin crew's actions may be very tactical in nature. The cabin crew often relies on cabin sign indications and pilot communications to suspend and resume services leading to inefficiency in their services. Lack of real-time weather data may lead to reduced comfort for passengers especially in business jets.

As such, it is desirable to provide a system that receives and processes weather data and flight plan data enabling a more precise prediction of operating conditions of the aircraft. This may help planning onboard operating procedures. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of a processing unit for receiving and processing weather data and flight plan data, an aircraft with such a processing unit, and a method for receiving and processing weather data and flight plan data are disclosed herein.

In a first non-limiting embodiment, a processing unit for receiving and processing weather data and flight plan data is provided. The processing unit comprises a processor, configured to receive flight plan data containing at least a moving path of an aircraft, receive weather data containing at least positional information and weather characteristics, compare the positional information of the weather data with the flight plan data, determine if the weather characteristics impact a predetermined operating condition of the aircraft, compare the impact of the weather characteristics to the operating condition with a predetermined threshold value, and configured to provide an indication signal indicating a section of the moving path of the aircraft where the impact of the weather characteristics to the operating condition exceeds the predetermined threshold value.

In a second non-limiting embodiment, an aircraft is provided, comprising a processing unit for receiving and processing weather data and flight plan data. The processing unit comprises a processor, configured to receive flight plan data containing at least a moving path of an aircraft, receive weather data containing at least positional information and weather characteristics, compare the positional information of the weather data with the flight plan data, determine if the weather characteristics impact a predetermined operating condition of the aircraft, compare the impact of the weather characteristics to the operating condition with a predetermined threshold value, and configured to provide an indication signal indicating a section of the moving path of the aircraft where the impact of the weather characteristics to the operating condition exceeds the predetermined threshold value.

In a third non-limiting embodiment, a method for receiving and processing weather data and flight plan data is provided, comprising the following steps: receiving flight plan data containing at least a moving path of an aircraft, receiving weather data containing at least positional information and weather characteristics, comparing the positional information of the weather data with the flight plan data, determining if the weather characteristics impact a predetermined operating condition of the aircraft, comparing the impact of the weather characteristics to the operating condition with a predetermined threshold value, and providing an indication signal indicating a section of the moving path of the aircraft where the impact of the weather characteristics to the operating condition exceeds the predetermined threshold value.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computer systems and other functional aspects of a computer system (and the individual operating components of the computer system) may not be described in detail herein. Furthermore, the connecting lines shown in the various figures contained herein are intended to represent example functional relationships and/or physical and/or mechanical couplings between the various elements. It should be noted that many alternative or additional functional relationships or physical connections may be present in an embodiment of the disclosure.

Figure 1:
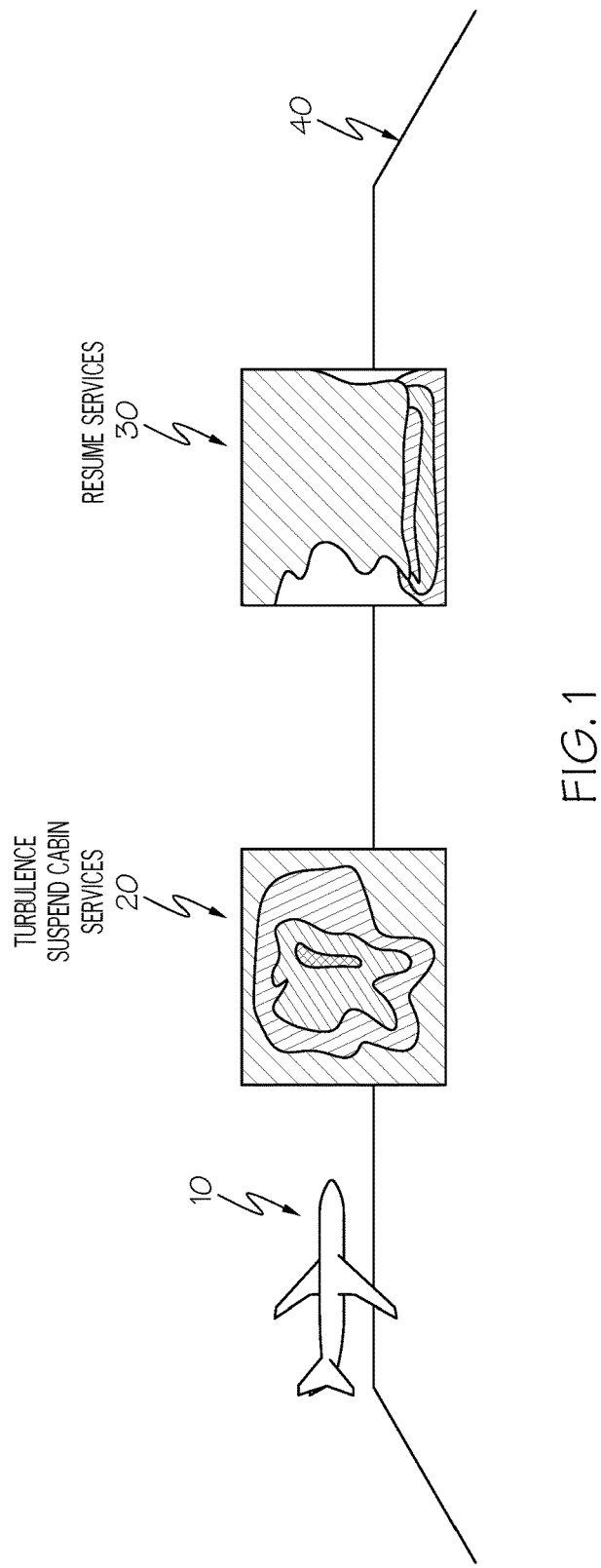
FIG. 1 is a diagrammatic representation of flight plan data and weather data in accordance with some embodiments.

Referring now to FIG. 1, an example of an airplane 10 is shown moving along a flight path or moving path 40. Along the moving path 40, different weather conditions may be present. These weather conditions can influence onboard operating processes. Therefore, relatively precise knowledge of the weather conditions, including specific weather characteristics and positional information of the weather characteristics along the moving path, may be helpful for planning onboard operating processes. An example of such operating processes may be various cabin services.

Oftentimes, it might not be possible to avoid flying through turbulence. At present, pilots and cabin crew communicate weather updates over internal communication systems. However, this communication is often tactical and provides limited time to respond to turbulence related events resulting in disrupted cabin services, repeating of services, and increased work load for the crew.

It has been found that when flights encounter frequent turbulence, the tactical handling of cabin services may create several problems. Providing efficient cabin services while at the same not violating standard operating procedures (SOPs) under these circumstances may be challenging. Some non-limiting examples of the problems include:
1. Interruptions to service procedures, because as per the SOPs the cabin crew has to stow carts and other service items as soon as possible.
2. Additional tasking, such as cabin announcements to inform passengers to return to their seats and fasten their seat belts.
3. Waiting for seat belt signs to go off to resume services to closure (additional effort/time)
4. Increased work load due to intermittent on/off cycles of the seat belt sign.
5. Lack of information regarding future weather and how it may impact cabin service plans.
6. If the food is already heated before stopping the service, the food may be cold and stale upon service resumption, as multiple heating of food may not be permitted. This may affect the service quality and completeness.
7. Stowing of carts and other service items multiple times reduces crew's performance.

The proposed and herein described solution strategically addresses these problems by providing turbulence information ahead of time coupled with flight plan and cabin service plan. It will reduce the workload of pilots and cabin crews. The proposed solution will be a natural extension of applications of platforms which provide connected weather.

Impacting a predetermined operating condition of the aircraft especially relates to the influence of the weather to the aircraft which require taking specific measures onboard the aircraft, for example, requiring the passengers and the cabin crew to sit down and fasten seat belt when experiencing turbulences.

As will be described herein, a processing unit is configured to determine if the weather impact exceeds a predetermined threshold value, i.e., if the weather conditions result in a cabin signal on so that cabin service must be interrupted. In case the threshold value is exceeded, the respective section of the moving path of the aircraft is indicated so that this information can be used to plan cabin service.

The proposed solution is to provide a system which utilizes real-time weather data and flight plan information and predicts segments along the flight plan (in particular, along the planned moving path or flight path of the aircraft) where the magnitude of turbulence exceeds a threshold level where the cabin sign is expected to be switched on and it is expected that the cabin crew will be unable to perform services. The system will determine the segments along the flight plan on a continuous basis (in real-time) where cabin services can be executed partially or fully, efficiently, and without violating any standard operating procedures (SOPs). It is to be understood that reference to a "system" in this disclosure refers to a processing unit and the functionally and/or structurally interrelated components located onboard an aircraft or remote from the aircraft. Described functions may be carried out by the processing unit described above and hereinafter.

Furthermore, the system will overlay weather information on the flight plan and display it on a portable display device or an installed device, along with segments in the passenger cabin where cabin services need to be suspended and regions in the passenger cabin where services can be executed.

As can be seen in FIG. 1, there are two segments 20, 30 along the moving path 40 of the aircraft 10 having different weather characteristics. When the aircraft passes segment 20, cabin services are suspended and when the aircraft passes segment 30, cabin service may be resumed.

The system is configured to model the cabin services procedures and the required time for execution, and schedules the services for each cabin partially or fully excluding the cabin-sign-on segments of the flight path where the services can be carried out. In one embodiment, the system may utilize machine learning algorithms and data analytics to capture any historic turbulence levels and includes this for more effective warnings/alerts. The system is configured to merge weather data, flight plan data, and, optionally, to consider historical weather data provided within a weather data database in order to generate sufficient warnings in advance of where the turbulence is expected so that the cabin crew can proactively secure the cabin and secure themselves before the aircraft encounters the turbulence thereby increasing the safety of the cabin crew.

In one embodiment, the system is configured to model the sequence of specific requests in the cabin and also attach the priority based on the passenger persona requirements. In one embodiment, the system is configured to model passenger service specific requirements and includes in the service schedule for effective service. It may also provide advisory information if some specific requests cannot be incorporated given a particular flight scenario. The system may utilize ADS_B and other feeds to proactively determine a possible CAT and advise in advance the cabin crew. In one embodiment, the system will provide visual or aural alerts indicating upcoming regions of turbulence. The system will trigger cabin announcement informing passengers to return to their seats and fasten the seat belts.

Figure 2:
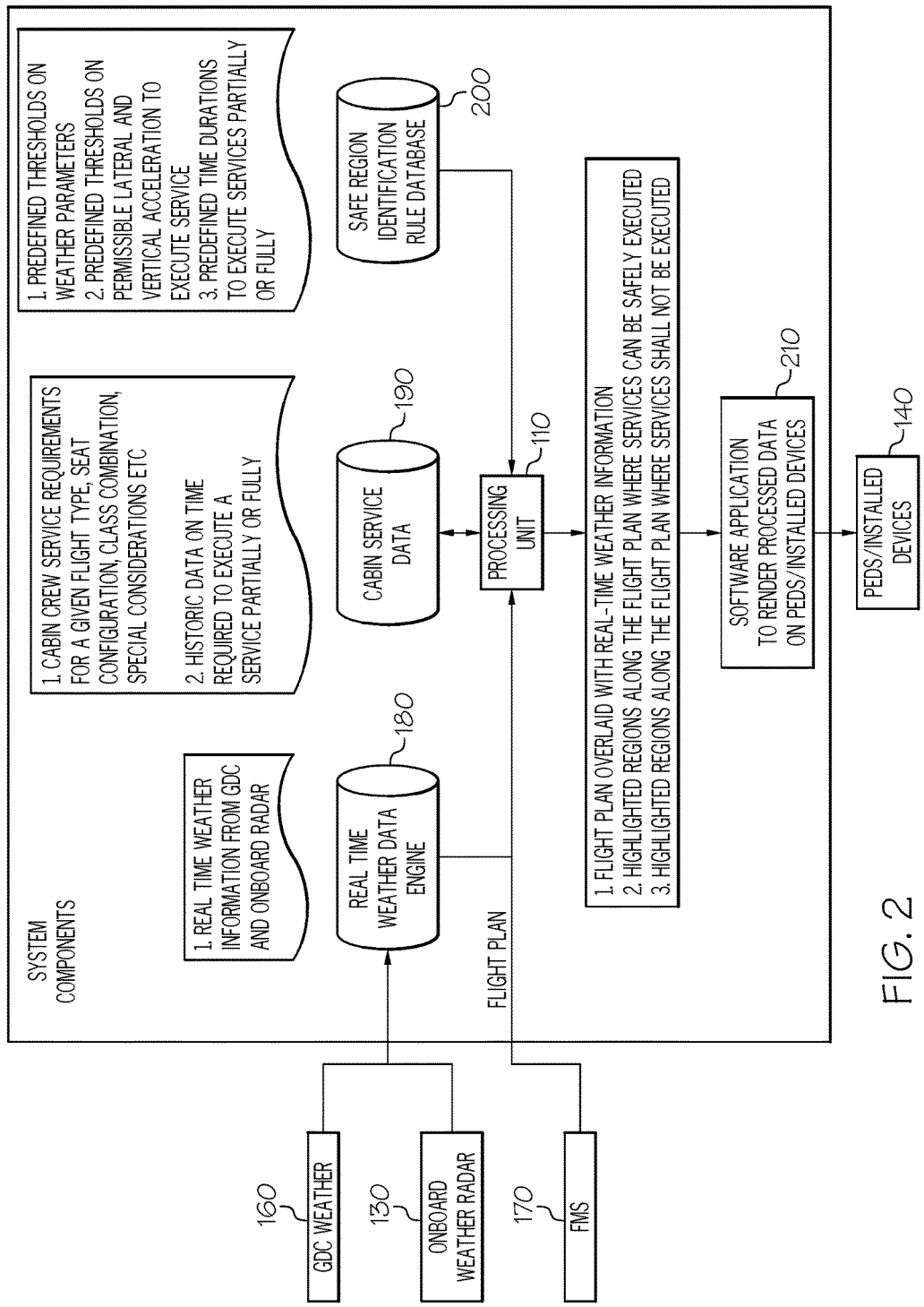
FIG. 2 is a diagrammatic representation of system components of an aircraft and the related functional interrelation between these components in accordance with some embodiments.

FIG. 2 shows a diagrammatic overview of a system described herein. A processing unit 110 is provided which receives flight plan data from a flight management system (FMS) 170 and weather data from an onboard weather RADAR 130 or any other onboard weather detecting system and/or from a remote component like a global data center (GDC) 160. The weather data may be real-time weather data. A weather data engine 180 is provided to merge weather data from the onboard weather RADAR 130 and the remote component 160. Onboard weather detecting systems are mostly limited in range. Therefore, considering global weather data from the remote component enables weather prediction along the entire flight path.

Cabin service data stored in a cabin service database 190 are provided to the processing unit 110. These cabin service data may define cabin crew service requirements for a given flight type, seat configuration, class combination, special considerations, etc.

Furthermore, a safe region identification rule database 200 is provided. This component may access a weather information database (not shown, may be part of the GDC 160) and may contain predefined thresholds on weather parameters, and/or predefined thresholds on permissible lateral and/or vertical accelerations to execute service, and/ or predefined time durations to execute cabin services partially or fully.

Considering all information referred to above, the processing unit 110 is configured to overlay flight plan data with weather information under further consideration of cabin service data, and highlight regions along the flight path where services can be safely executed and/or regions along the flight path where cabin service shall not be executed.

A functional module, e.g., a processor, may be provided as part of the processing unit 110 and may be configured to execute these functions. At least some of the functions may be implemented as software components and the result may be displayed on portable electronic devices (PED) 140 or on stationary installed displays 140. A rendering component 210 may be provided to render the information for being displayed.

The processing unit 110 may be configured to segment the passenger cabin into several segments and to determine if the cabin service can be executed for one or more of these segments and/or for which of these segments the cabin service can be executed between two turbulent weather regions. These segments may be indicated on the display devices together with the weather data and the flight plan data.

In one embodiment and with reference to FIG. 2, the proposed system comprises a processing unit that receives and stores real time weather information from an external remote entity (GDC, for example) and onboard weather determining units (onboard weather RADAR, for example) and which processing unit is configured to perform various functions. These functions include:

a. Processing real-time weather information from onboard RADAR and/or GDC and identifies areas of turbulence that can affect cabin services and/or passenger/crew safety;

b. Utilizing predefined thresholds to determine areas of turbulence by comparing predicted weather parameters along the flight plan against permissible thresholds to determine areas exceeding or not exceeding predetermined weather characteristic threshold values, respectively;

c. Determining turbulence at a given segment by determining vertical accelerations (G-Factor) in that area and comparing it to previously stored vertical accelerations in similar weather conditions;

d. Receiving flight plan information from the FMS and plotting it on a display system;

e. Continuously repeating these processes throughout the flight to keep the information updated;

f. Depending on the duration of availability of non-turbulence regions and the preset times to carry out a service, selecting and displaying ahead of time the services that can be partially or fully executed. Services that are suitable to be carried out for current aircraft configuration are only selected based on predefined rules;

g. Providing visual and aural alerts and warnings about certain areas and actions to be taken by crew members in advance by integrating a voice to text engine or by playing pre-recorded audio files;

h. Providing warnings to passengers to return to their seats and fasten seat belts by communicating with onboard content management system (CMS)/in-flight entertainment (IFE) system.

In one embodiment and with reference to FIG. 2, the system comprises a first database 190 consisting of cabin service requirements for a given aircraft type, seating configuration, class combinations, special considerations, historic time duration to execute a service partially or fully etc. Further details will include identification of aircraft type by various attributes including but not limited to size (small, mid, large), aisle, business, commercial air-transport etc.

In one embodiment and with reference to FIG. 2, the system comprises a second database 200 storing predefined thresholds on weather parameters that contribute identification of severe turbulence conditions, predefined thresholds on permissible lateral and vertical accelerations, predefined thresholds on permissible vibrations execute partial or full cabin service. The first and second databases may be implemented in the same functional component or separate from each other.

The processor may be configured to process cabin service information in conjunction with re-arrange cabin service schedule according to the regions that are clear from turbulence. In other words, the processor may be configured to determine and identify one or multiple time gaps and/or flight path segments and which rows to do the service for during this time gap or flight path segment.

All functions carried out by the processing unit or by the processer may be implemented together in one embodiment of the processing unit.

Figure 3:
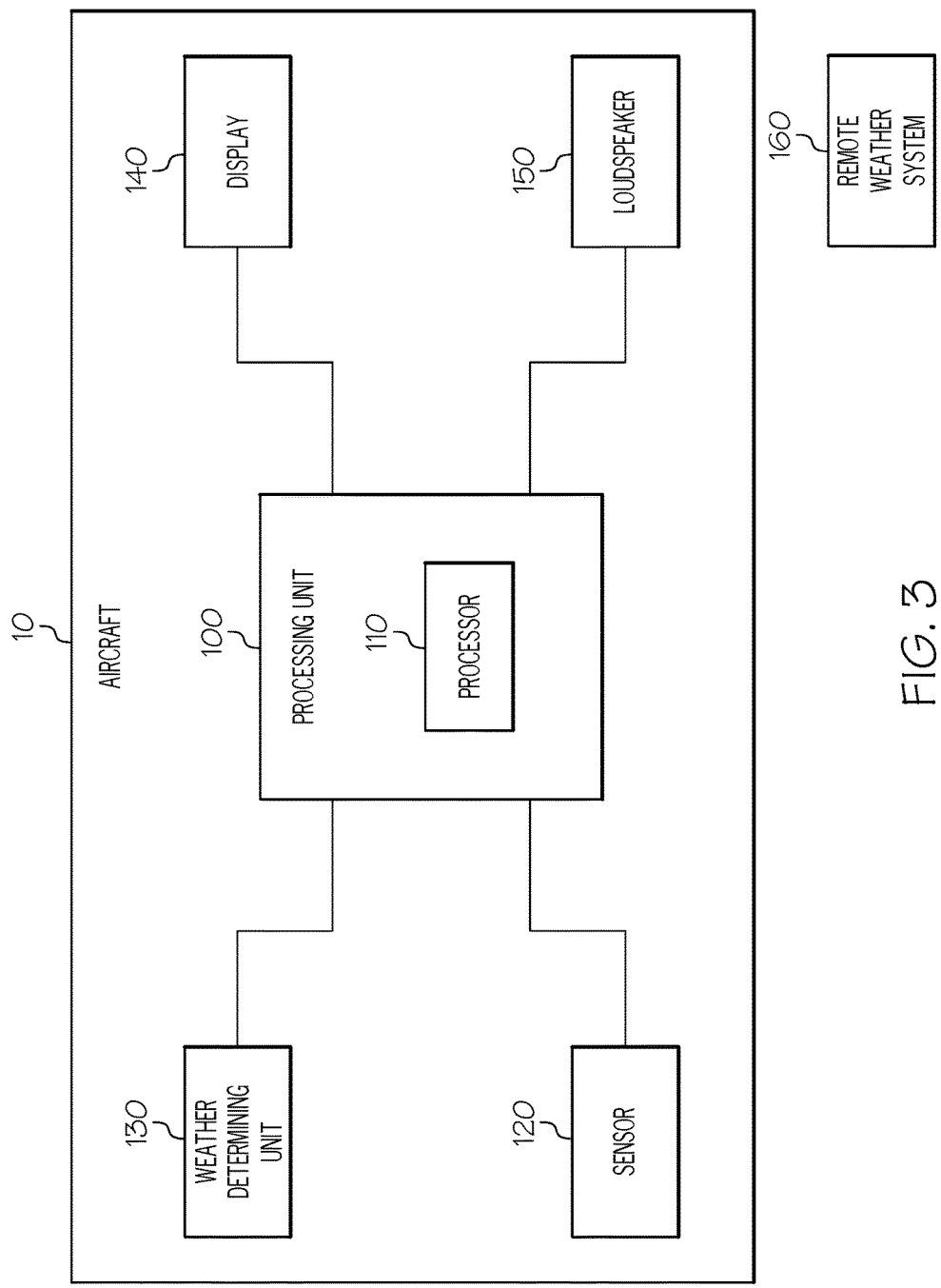
FIG. 3 is a simplified diagrammatic representation of an aircraft in accordance with some embodiments.

FIG. 3 diagrammatically describes an aircraft 10 comprising a system as described above with reference to FIGS. 1 and 2. The aircraft 10 comprises a processing unit 100 with a processor 110, wherein the processing unit 110 is communicatively coupled to onboard weather determining unit 130 and sensor 120 for determining an acceleration of the aircraft 10. Furthermore, the processing unit is communicatively coupled to a display 140 and a loudspeaker 150. The processing unit 100 may be configured to receive weather data from an external remote weather system 160. For transmitting weather data between external unit 160 and processing unit 100, a wireless communication channel may be utilized.

It is noted that FIG. 3 shows a simplified diagram and does not show all components indicated in FIG. 2. However, the additional components shown in FIG. 2 may of course be part of the embodiment shown in and described with reference to FIG. 3.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
a display device responsive to commands to render images;
a real-time weather data engine configured to receive and merge real-time weather data supplied from an onboard weather RADAR and from a global data center, the weather data including at least positional information and weather characteristics;
a cabin services data source that stores cabin services data, the cabin services data defining at least cabin crew service requirements for a given flight type, seat configuration, class combination, and historic time needed to execute partial and full cabin services;
a safe region identification rule database that stores safe region data, the safe region data representative of predefined thresholds on weather parameters, predefined thresholds on permissible lateral and vertical accelerations to execute service, and predefined time durations to execute partial and full cabin services;
a flight management system configured to supply flight plan data that contains at least a moving path of the aircraft;
a processing unit in operable communication with the real-time weather data engine, the cabin services data source, the safe region identification rule database, the flight management system, and the display, the processing unit coupled to receive (i) merged real-time weather data from the real-time weather data source, (ii) cabin services data from the cabin services data source, (iii) safe region data from the safe region identification rule database, and (iv) flight plan data from the flight management system, the processing unit configured, upon receipt of these data, to:
model cabin services procedures and required time for execution thereof,
implement machine learning algorithms and data analytics to capture historic turbulence levels,
overlay the flight plan data with the real-time weather data,
determine if the weather characteristics of the real-time weather data and the historic turbulence levels impact a predetermined operating condition of the aircraft;
compare the impact of the weather characteristics to the predetermined operating condition with a predetermined threshold value,
determine regions along the flight path where the impact of the weather characteristics to the operating condition exceeds the predetermined threshold value,
determine, within the regions that the predetermined threshold value, which cabin services and segments of the passenger cabin where the cabin services must be suspended and which cabin services and regions in the passenger cabin where the cabin services can be executed, and
command the display to render images of the flight plan data overlaid with the real-time weather data to indicate where, along the flight path, action must be taken by a flight crew to:
 (i) suspend the determined cabin services and the segments of the passenger cabin where the cabin services must be suspended, and
 (ii) execute the determined cabin services and the segments of the passenger cabin where the cabin services can be executed.

2. The aircraft of claim 1, wherein the flight plan data comprises a time stamp indicating a position of the aircraft at given times.

3. The aircraft of claim 1, wherein the positional information of weather data comprises at least one of position, expansion, moving direction of a region along a flight path of the aircraft, which region has a substantially uniform weather characteristic and/or wherein the weather characteristics comprise at least one of temperature, wind speed, wind direction.

4. The aircraft of claim 1, further comprising at least one sensor for determining accelerations of the aircraft, wherein the processing unit is configured to determine vertical accelerations of the aircraft based on acceleration signals sensed by the at least one sensor.

5. The aircraft of claim 1, further comprising a loudspeaker, wherein the processing unit is further configured to provide signals to the loudspeaker for an aural alert if the impact of the weather characteristics to the operating condition exceeds the predetermined threshold value.

* * * * *